US010655825B2

(12) United States Patent
Winslett et al.

(10) Patent No.: US 10,655,825 B2
(45) Date of Patent: *May 19, 2020

(54) RECESSED HOUSING CLIP

(71) Applicant: Eaton Intelligent Power Limited, Dublin (IE)

(72) Inventors: Michael Troy Winslett, Fairburn, GA (US); Mahendra Joseph Macwan, Sharpsburg, GA (US); Philip Dean Winters, Senoia, GA (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/404,419

(22) Filed: May 6, 2019

(65) Prior Publication Data
US 2019/0323692 A1 Oct. 24, 2019

Related U.S. Application Data

(63) Continuation of application No. 14/925,817, filed on Oct. 28, 2015, now Pat. No. 10,281,120.
(Continued)

(51) Int. Cl.
F21V 21/04 (2006.01)
F16M 13/02 (2006.01)
(Continued)

(52) U.S. Cl.
CPC .............. *F21V 21/04* (2013.01); *F16B 2/241* (2013.01); *F16M 13/022* (2013.01); *F21S 8/026* (2013.01);
(Continued)

(58) Field of Classification Search
CPC ...... F21V 21/04; F21V 21/041; F21V 21/044; F21V 21/043; F21V 21/045;
(Continued)

(56) References Cited

U.S. PATENT DOCUMENTS 5,707,143 A * 1/1998 Hentz ..................... F21S 8/02
362/147
5,826,970 A 10/1998 Keller
(Continued)

*Primary Examiner* — Bryon T Gyllstrom
*Assistant Examiner* — Colin J Cattanach
(74) *Attorney, Agent, or Firm* — King & Spalding LLP

(57) ABSTRACT

A friction clip includes a coupling portion having a coupling element, a middle portion adjacent the coupling portion, and an end portion adjacent the middle portion and opposite the coupling portion. The middle portion includes a bent out tab having a first interference edge configured to engage an internal wall of a first canister having a first diameter and the end portion includes a second interference edge configured to engage an internal wall of a second canister having a second diameter. Alternatively, a multi-part friction clip includes a first member that is couplable to a light module, and a second member that is removably couplable to the first member. The second member includes a coupling portion configured to removably engage with the first member, a middle portion having a bent out tab that includes a first interference edge, and an end portion that includes a second interference edge.

20 Claims, 15 Drawing Sheets

Related U.S. Application Data

(60) Provisional application No. 62/069,654, filed on Oct. 28, 2014, provisional application No. 62/199,501, filed on Jul. 31, 2015.

(51) Int. Cl.
*F16B 2/24* (2006.01)
*F21V 21/03* (2006.01)
*F21V 21/02* (2006.01)
*F21S 8/02* (2006.01)
*F21S 8/04* (2006.01)

(52) U.S. Cl.
CPC .................. *F21S 8/028* (2013.01); *F21S 8/04* (2013.01); *F21V 21/02* (2013.01); *F21V 21/03* (2013.01); *F21V 21/041* (2013.01); *F21V 21/047* (2013.01); *F21V 21/048* (2013.01); *F21V 21/049* (2013.01)

(58) Field of Classification Search
CPC .... F21V 21/046; F21V 21/047; F21V 21/048; F21V 21/049; F21S 8/02; F21S 8/026
See application file for complete search history.

(56) References Cited

U.S. PATENT DOCUMENTS

| | | | |
|---|---|---|---|
| 5,836,678 A * | 11/1998 | Wright | F21S 8/02 362/364 |
| 6,361,193 B1 * | 3/2002 | Gabrius | F21S 8/02 362/147 |
| 6,979,108 B1 | 12/2005 | Berge | |
| 7,862,214 B2 | 1/2011 | Trott et al. | |
| D636,921 S * | 4/2011 | Van de Ven | D26/74 |
| 8,057,070 B2 | 11/2011 | Negley | |
| 8,182,119 B2 | 5/2012 | Trott et al. | |
| 8,292,453 B2 | 10/2012 | Trott et al. | |
| 8,596,811 B2 | 12/2013 | Trott et al. | |
| 9,482,398 B2 | 11/2016 | Luk | |
| 10,281,120 B1 * | 5/2019 | Winslett | F21V 21/04 |
| 2008/0106907 A1 * | 5/2008 | Trott | F21S 8/026 362/368 |
| 2011/0075414 A1 * | 3/2011 | Van De Ven | F21V 15/01 362/235 |
| 2012/0106176 A1 | 5/2012 | Lopez | |
| 2012/0140490 A1 | 6/2012 | Rowlette, Jr. | |
| 2012/0162999 A1 * | 6/2012 | Dupre | F21S 8/026 362/365 |
| 2012/0262921 A1 | 10/2012 | Boomgaarden | |
| 2013/0258685 A1 * | 10/2013 | Clifton | F21V 15/04 362/390 |
| 2013/0265750 A1 * | 10/2013 | Pickard | F21V 21/088 362/184 |
| 2013/0271982 A1 * | 10/2013 | Rodriguez | F21V 15/01 362/235 |
| 2015/0043201 A1 | 2/2015 | Liu | |
| 2015/0241037 A1 | 8/2015 | Zhang | |
| 2015/0338071 A1 | 11/2015 | Feit | |
| 2015/0362169 A1 * | 12/2015 | Hodrinsky | F21V 29/74 315/112 |
| 2016/0230937 A1 * | 8/2016 | Kim | F21V 19/04 |

* cited by examiner

RECESSED HOUSING CLIP

CROSS REFERENCE TO RELATED APPLICATIONS

The present application is a continuation application of and claims priority to U.S. Non-Provisional patent application Ser. No. 14/925,817 filed Oct. 28, 2015 and titled "Recessed Housing Clip," which application claims priority under 35 U.S.C. § 119 to U.S. Provisional Patent Application No. 62/069,654, titled Push and Twist Recessed Housing Clip, filed Oct. 28, 2014, and to U.S. Provisional Application No. 62/199,501, titled Multi-Part Friction Clip, filed Jul. 31, 2015. All of the foregoing applications are hereby fully incorporated herein by reference.

TECHNICAL FIELD

Embodiments of the invention relate generally to lighting fixtures. Specifically, embodiments of the present disclosure relate to housing friction clips with improved retention means and canister size adaptability.

BACKGROUND

Many recessed lighting fixture assemblies include a canister portion and a light module portion. The canister is typically mounted into a hole formed in the ceiling and establishes a mounting structure for receiving the light module. The light module is then installed into and suspended from the canister. In particular, a plurality of conventional friction clips attached to the light module keep the light module retained within the canister. However, over time, the conventional friction clips may slip or slack within the canister, causing the position of the light module to slip as well. This can cause extra space between the light module and the ceiling or lopsidedness of the light module, which is visually undesirable. Furthermore, the conventional friction clips are designed to fit within a canister of a certain size. Thus, multiple friction clip models are needed for canisters of different sizes, which means more product SKUs and less product compatibility.

SUMMARY

In one aspect, the present disclosure can relate to a lighting module. The lighting module includes a module housing that has a top surface. Further, the lighting module includes a friction clip. The friction clip includes a coupling portion that is rotatably coupled to the top surface, and an end portion that is coupled to the coupling portion at a compound angle. The end portion includes an interference edge that is at an angle to the top surface of the module housing and the coupling portion. The interference edge is configured to lodge against an internal wall of a first canister when the lighting module is disposed within the first canister. Further, a rotation of the module housing moves the friction clip further up the internal wall of the first canister, tightening the lighting module against the first canister.

In another aspect, the present disclosure can relate to a friction clip. The friction clip includes a coupling portion having a rotative coupling element. Further, the friction clip includes a middle portion that is adjacent the coupling portion. The middle portion includes a bent out tab that includes a first interference edge that is configured to lodge into an internal wall of a first canister. Furthermore, the friction clip includes an end portion that is adjacent the middle portion and opposite the coupling portion. The end portion includes a second interference edge configured to lodge into an internal wall of a second canister, where the second canister has an internal diameter larger than that of the first canister.

In yet another aspect, the present disclosure can relate to another friction clip. The friction clip includes a first member that is adapted to be coupled to a light module, and a second member that is adapted to be removably coupled to the first member. The second member includes a coupling portion that removably engages with the first member. Further, the second member includes an end portion that is opposite the coupling portion. The end portion includes an interference edge that is configured to lodge into an internal wall of a canister.

These and other aspects, objects, features, and embodiments will be apparent from the following description and the appended claims.

BRIEF DESCRIPTION OF THE FIGURES

Reference will now be made to the accompanying drawings, which are not necessarily drawn to scale, and wherein.

Figure 1:
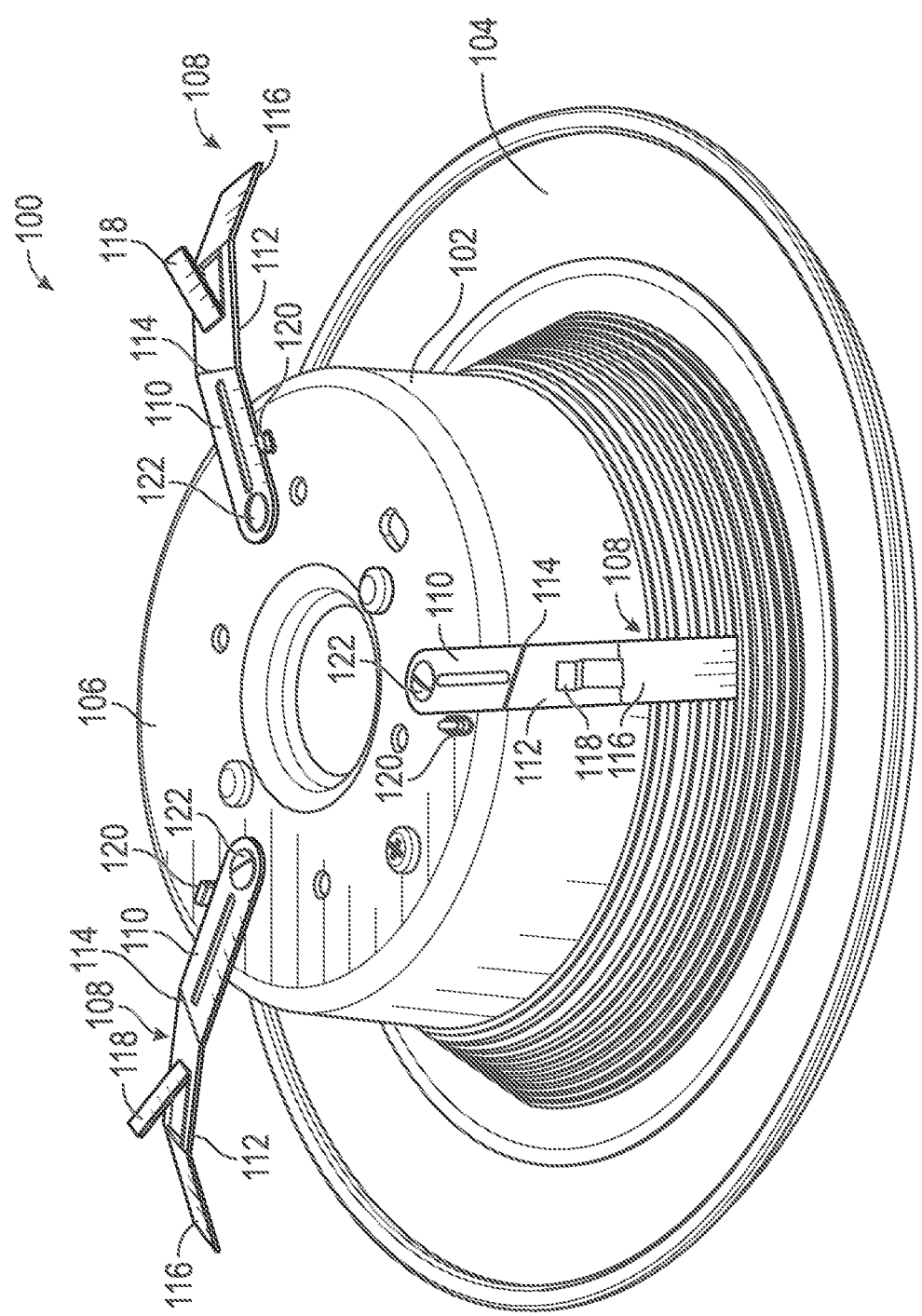
FIG. 1 illustrates a perspective view of a lighting module with single-piece friction clips, in accordance with example embodiments of the present disclosure.

The drawings illustrate only example embodiments of the invention and are therefore not to be considered limiting of its scope, as the invention may admit to other equally effective embodiments. In the drawings, reference numerals designate like or corresponding, but not necessarily identical, elements.

DETAILED DESCRIPTION OF EXAMPLE EMBODIMENTS

Figure 2:
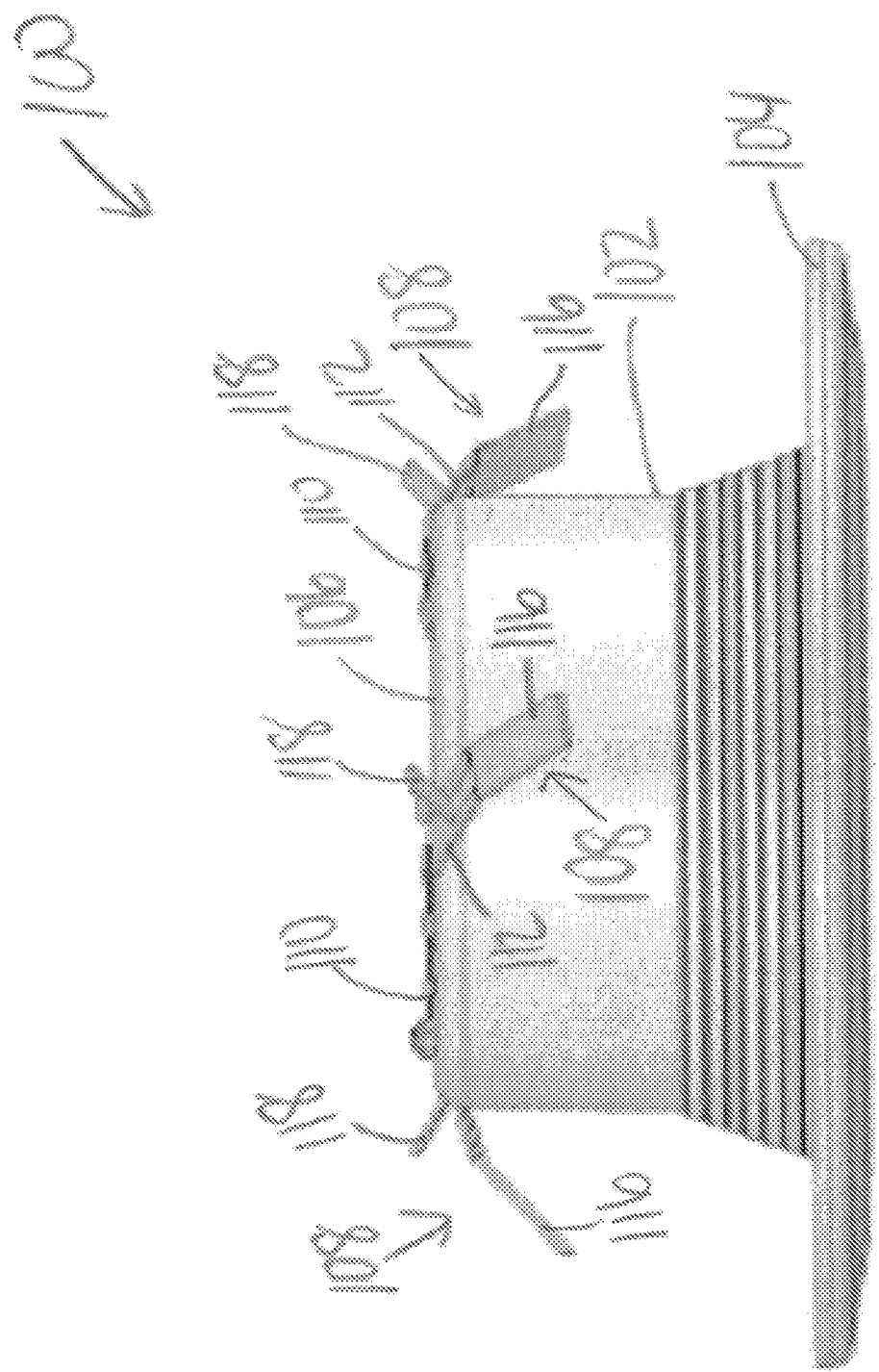
FIG. 2 illustrates a side view of the lighting module with single-piece friction clips, in accordance with example embodiments of the present disclosure.
Figure 3:
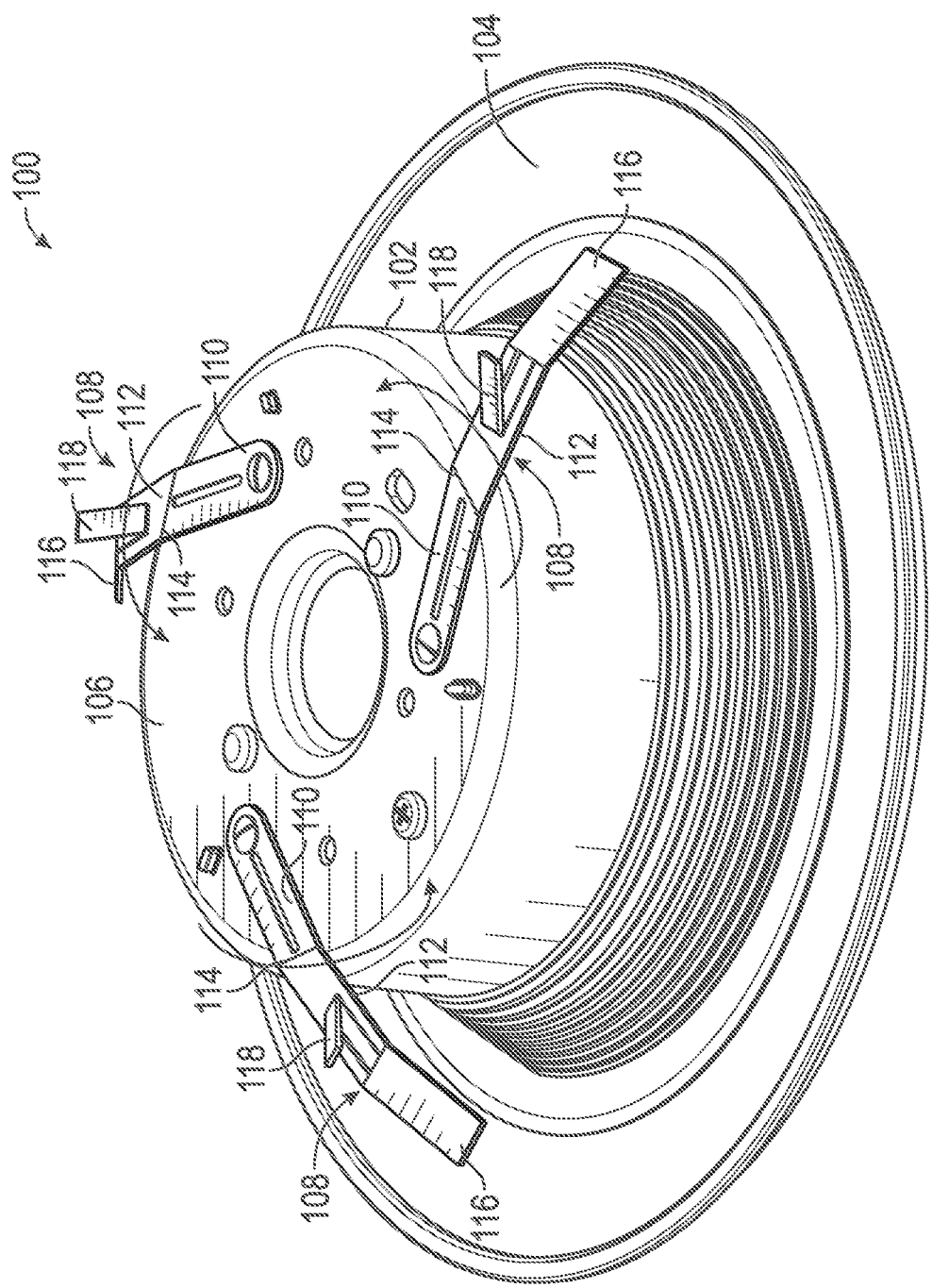
FIG. 3 illustrates a perspective view of the lighting module in which the single-piece friction clips are in a retracted position, in accordance with example embodiments of the present disclosure.
Figure 8:
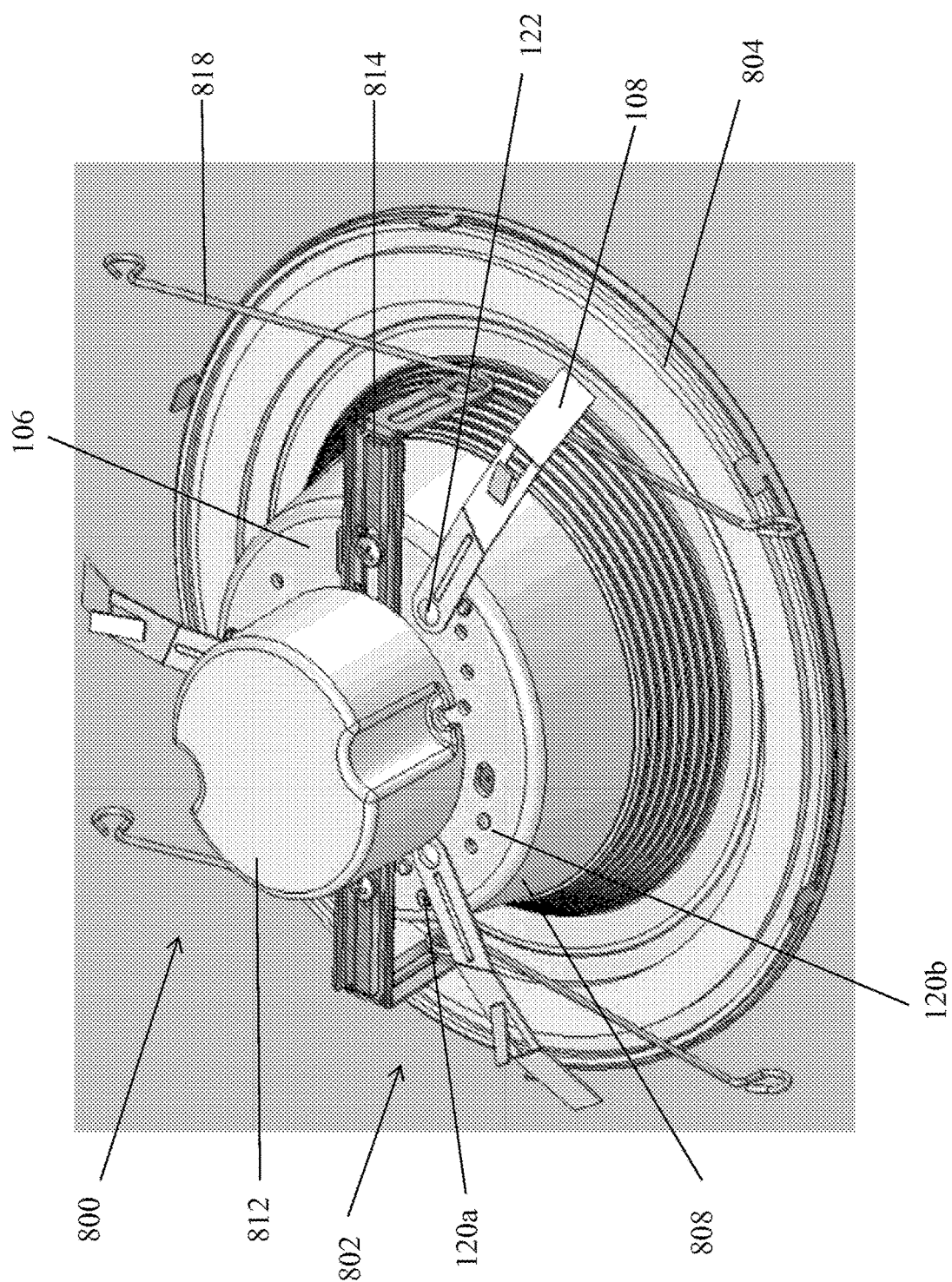
FIG. 8 illustrates a perspective view of a lighting module having single-piece friction clips and torsion springs mounted thereon, in accordance with an example embodiment of the lighting module.
Figure 9:
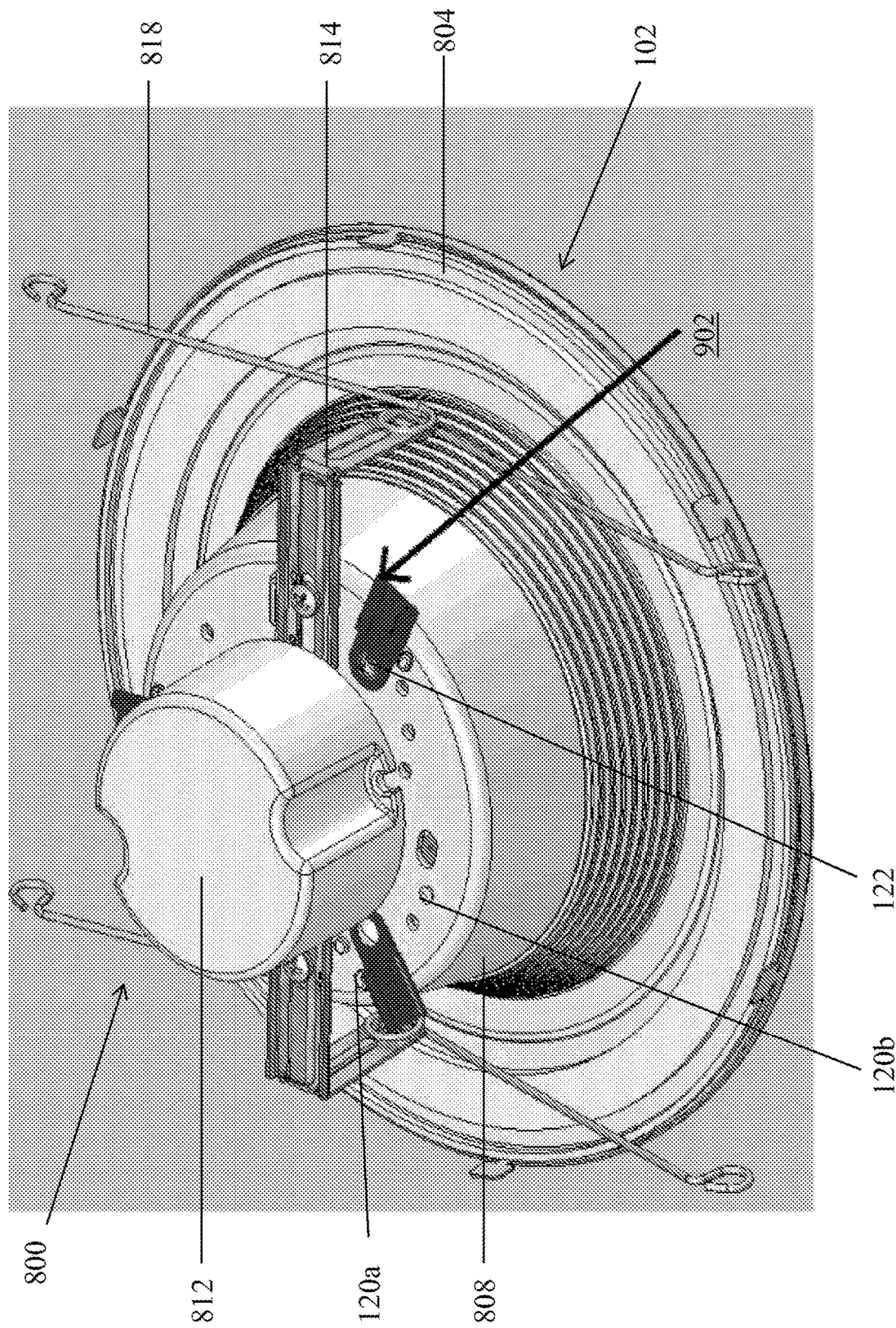
FIG. 9 illustrates a perspective view of the lighting module having a first member of two-part friction clips mounted thereon, in accordance with example embodiments of the present disclosure.
Figure 10:
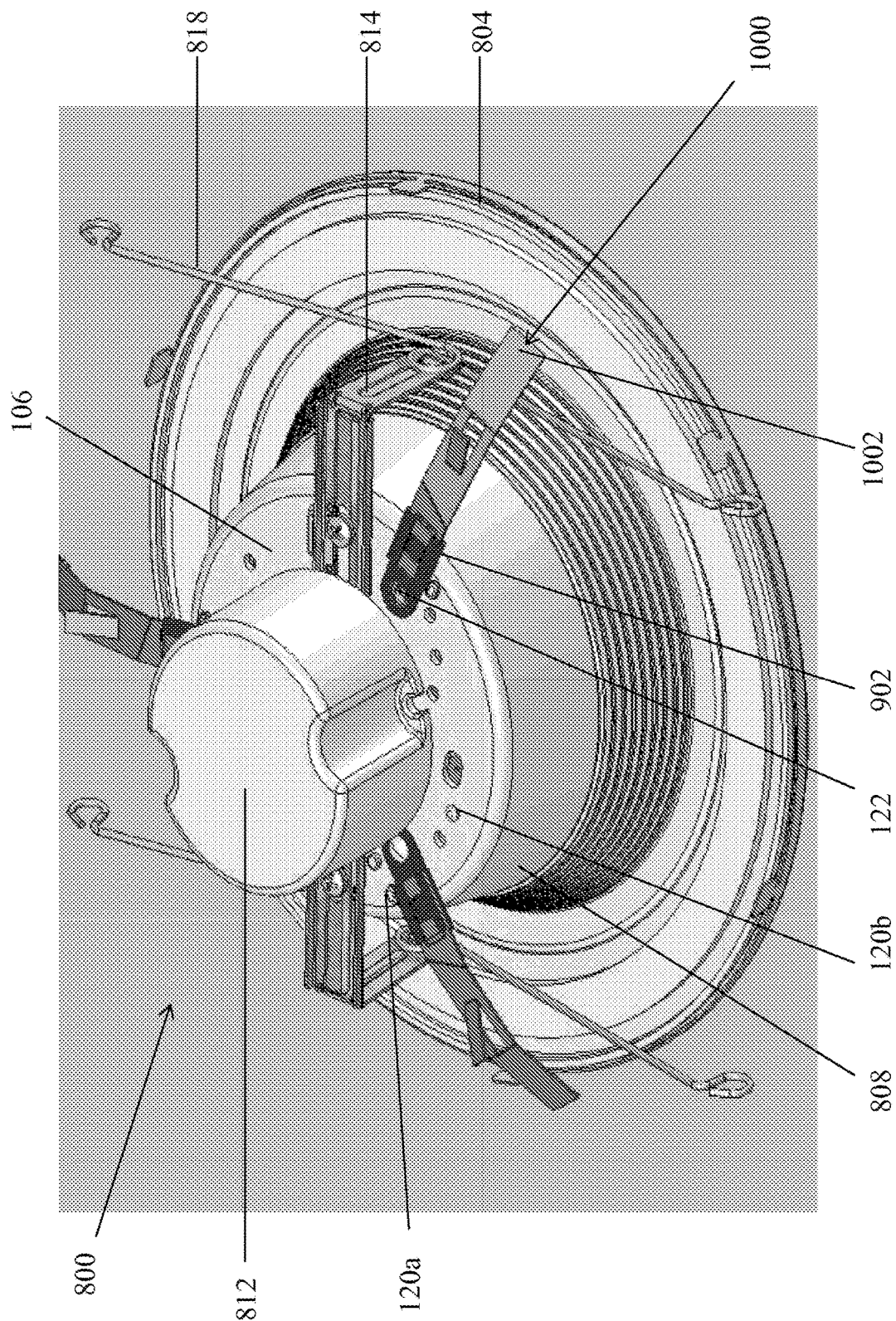
FIG. 10 illustrates a perspective view of the lighting module in which a second member of each two-part friction clip is coupled to the first member of the respective two-part friction clip which in turn is mounted on the lighting module, in accordance with example embodiments of the present disclosure.

In the following paragraphs, the present disclosure will be described in further detail by way of examples with reference to the attached drawings. In the description, well known components, methods, and/or processing techniques are omitted or briefly described so as not to obscure the disclosure. As used herein, the "present disclosure" refers to any one of the embodiments of the disclosure described herein and any equivalents. Furthermore, reference to various feature(s) of the "present disclosure" is not to suggest that all embodiments must include the referenced feature(s).
Single-Piece Friction Clips FIG. 1 illustrates a perspective view of a lighting module 100 having a plurality of single-piece friction clips, in accordance with example embodiments of the present disclosure. FIG. 2 illustrates a side view of the lighting module with single-piece friction clips, in accordance with example embodiments of the present disclosure. FIG. 3 illustrates a perspective view of the lighting module in which the single-piece friction clips are in a retracted position, in accordance with example embodiments of the present disclosure. Referring to FIGS. 1-3, the lighting module 100 also includes a housing 102. In one example embodiment, the housing 102 may be (or may be referred to as) a heat sink module as illustrated in FIGS. 8-10. In certain example embodiments, the housing 102 includes a flange 104 and a top 106. In certain example embodiments, the single-piece friction clips 108 (herein 'friction clips 108') are coupled to the top 106 of the housing 102 via fasteners 122 (e.g., screws, rivets, etc.). In certain example embodiments, the fasteners 122 function as pivot points for the friction clips 108, allowing the fiction clips 108 to be movable from a fully extended position, as illustrated in FIG. 1, to a retracted position, as illustrated in FIG. 3. In certain example embodiments, the retracted position can be various degrees from the fully extended position. In certain example embodiments, the light module 100 further includes a plurality of stops 120 disposed on the top 106 of the housing 102. The stops 120 are raised and disposed next to each of the friction clips 108 such that the friction clips 108 cannot rotate past the stops 120. This keeps the frictions clips 108 in the fully extended position as the lighting module 100 is rotated during installation, the details of which are described below with respect to FIG. 7.

Figure 4:
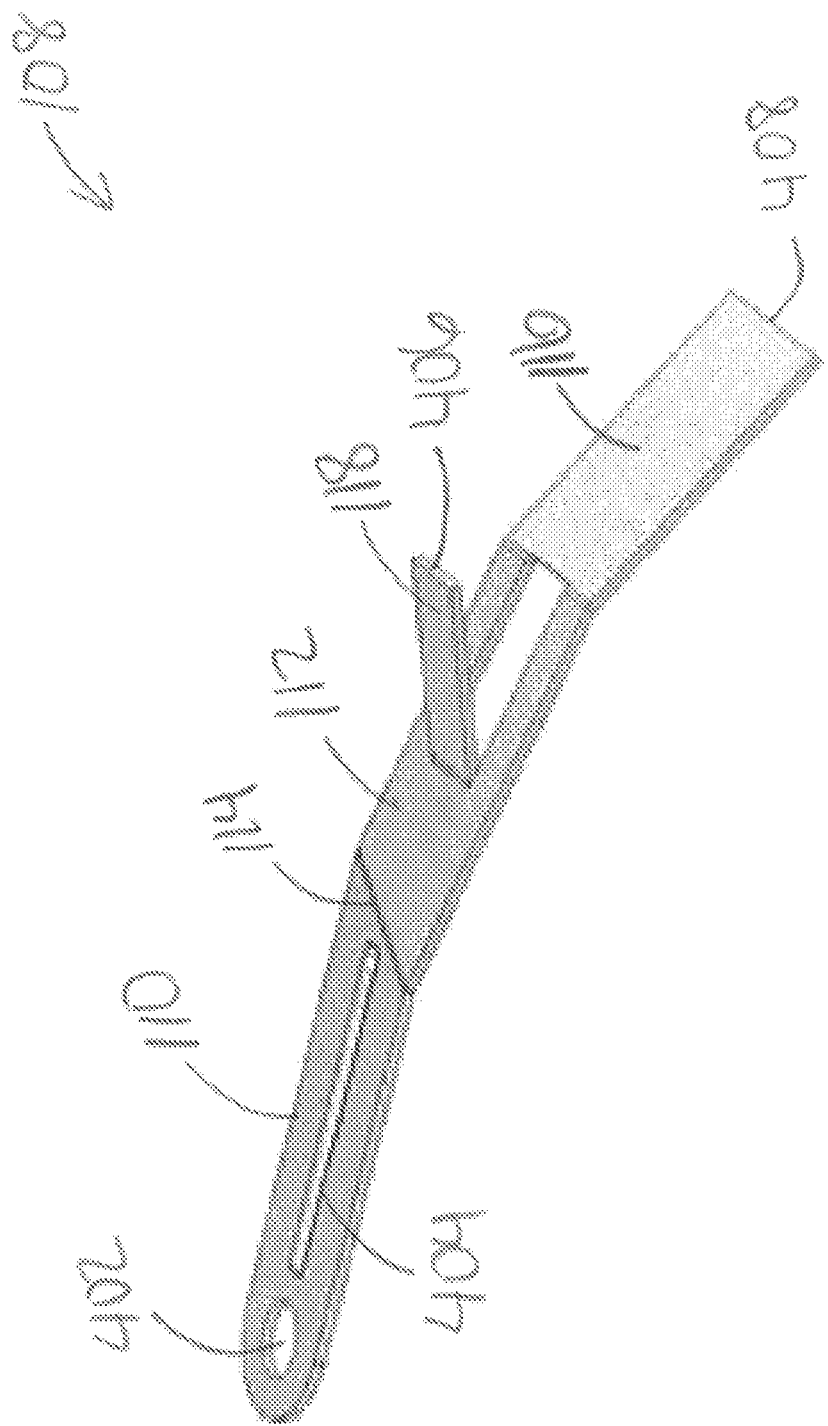
FIG. 4 illustrates a perspective view of a single-piece friction clip, in accordance with example embodiments of the present disclosure.
Figure 5:
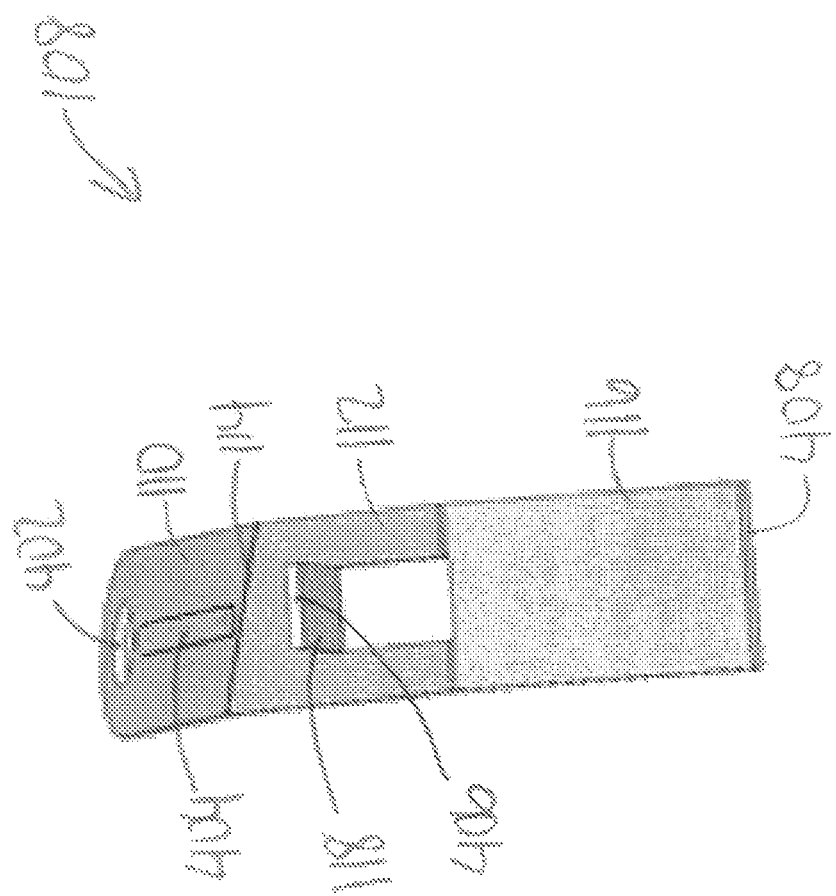
FIG. 5 illustrates a side view of the single-piece friction clip, in accordance with example embodiments of the present disclosure.
Figure 6:
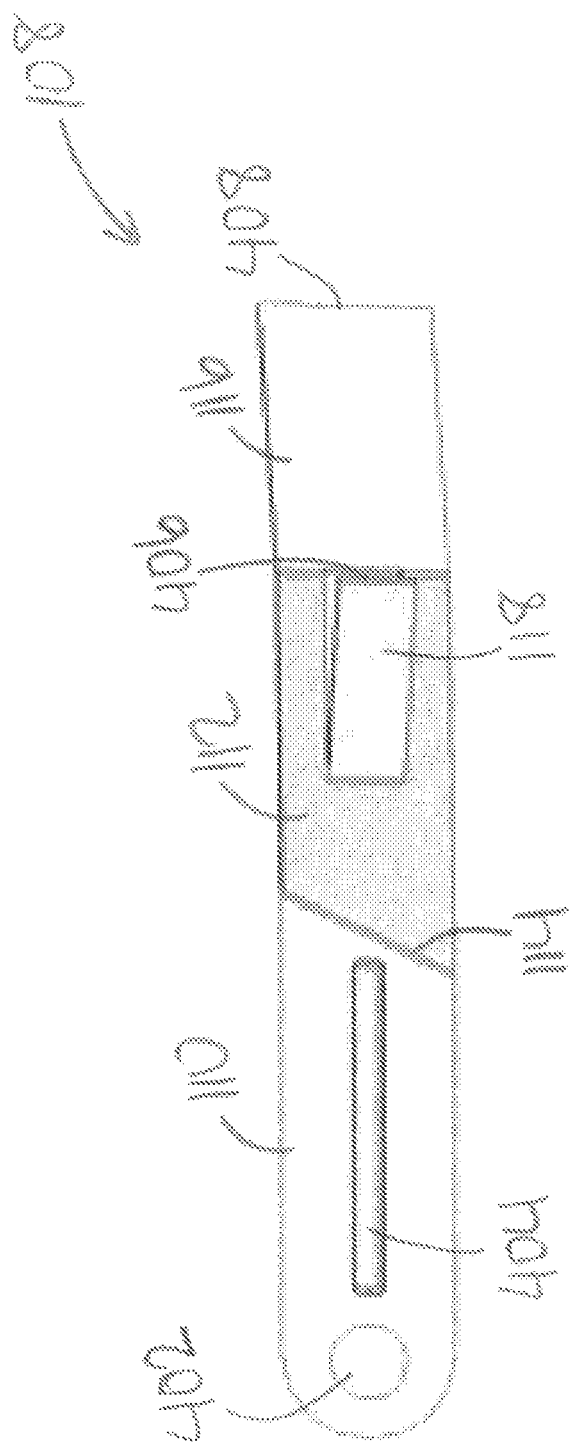
FIG. 6 illustrates a top view of the single-piece friction clip, in accordance with example embodiments of the present disclosure.

FIG. 4 illustrates a perspective detailed view of a single friction clip 108, FIG. 5 illustrates a side view of the friction clip 108, and FIG. 6 illustrates a top view of the friction clip 108, in accordance with example embodiments of the present disclosure. Referring to FIGS. 1-6, in certain example embodiments, the friction clip 108 includes three main portions: a coupling portion 110, a middle portion 112, and an end portion 116. In certain example embodiments, the coupling portion 110 includes an aperture 402 and/or a slot. The aperture 402 allows the friction clip 108 to be coupled to the top 106 of the housing 102 via a fastener 122 and rotate about the fastener 122.

In certain example embodiments, the middle portion 112 is adjacent the coupling portion 110 at a compound angle 114. Specifically, the middle portion 112 is at an angle from the coupling portion 110 horizontally as well as vertically. In certain example embodiments, the middle portion 112 is only at a horizontal angle or only at a vertical angle to the coupling portion 110. In certain example embodiments, the middle portion 112 includes a bent out tab 118 that is partially cut out and raised from middle portion 112. The tab 118 includes a first interference edge 406. The first interference edge 406 is configured to bias the inside wall of a canister of a first size. In such example embodiments, the spring force of the friction clip against the wall of the canister and the friction between the first interference edge 406 and the wall retains the lighting module 100 within the canister. In certain example embodiments, the end portion 116 is adjacent to the middle portion 112 opposite the coupling portion 110.

In certain example embodiments, the end portion 116 is bent at a horizontal angle from the plane of the middle portion 112. In certain example embodiments, the end portion 116 is bent at a compound angle in which the end portion 116 is at a horizontal angle as well as a vertical angle to the middle portion 112. In certain example embodiments, the end portion 116 includes a second interference edge 408. The second interference edge 408 is configured to bias the inside wall of a canister of a second size. In such example embodiments, the spring force of the friction clip 108 against the wall of the canister and the friction between the second interference edge 408 and the wall retains the lighting module 100 within the canister. In certain example embodiments, the canister of a second size has a larger internal diameter than the canister of a first size. For example, the first size can be five inches and the second size can be six inches. The presence of multiple interference edges 406, 408 allows the same friction clip 108 to fit and provide retention within canisters of multiple sizes.

In certain other example embodiments, the friction clip 108 includes only two portions, wherein a coupling portion 110 is directly adjacent an end portion 116. In such example embodiments, the tab 118 is in the end portion 116. In such example embodiments, the end portion 116 is formed at a compound angle from the coupling portion 110. In certain other example embodiments, the friction clip 108 includes more than three portions. In such example embodiments, the friction clip 108 includes a coupling portion 110 and an end portion 116, and a plurality of segments in between the coupling portion and the end portion, in which the tab 118 can be formed in any of the plurality of segments. In certain such example embodiments, a tab 118 can be formed in multiple segments, generating multiple interference edges. In certain example embodiments, the compound angle 114 can be formed between any one or more segments. In certain example embodiments, a horizontal angle is formed between a first set of two segments and a vertical angle is formed between a second set of two segments.

In certain example embodiments, the friction clip 108 is continuous and has twists or curved compound bends rather than sharp angular bends as shown in the figures. In such example embodiments, the first and second interference edges 406, 408 are still at an angle to the top 106 of the housing 102. In certain example embodiments, the friction clips 108 are fabricated from a metallic material. In certain example embodiments, the friction clips 108 are fabricated integrally from one continuous piece of material.

Figure 7:
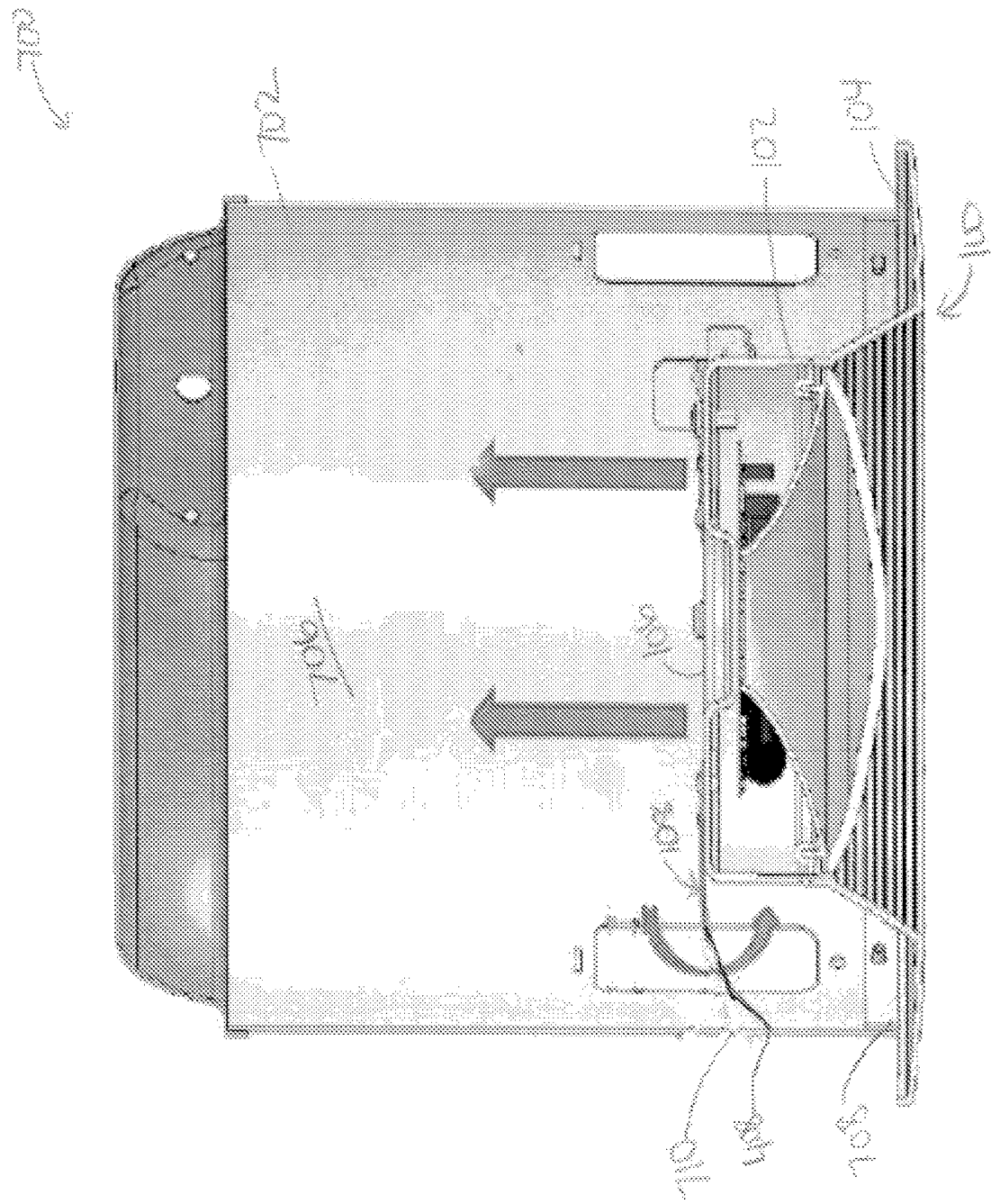
FIG. 7 illustrates a cross-sectional view of a recessed lighting fixture assembly, in accordance with example embodiments of the present disclosure.

FIG. 7 illustrates a cross-sectional view of a recessed lighting fixture assembly 700, in accordance with example embodiments of the present disclosure. The assembly 700 includes a lighting canister 702 and the light module 100 of FIGS. 1-3. FIG. 7 shows the light module 100 installed within the lighting canister 702. The majority of the housing 102, including the housing top 106 is within a cavity 706 of the canister 702. In certain example embodiments, the flange 104 remains external to the canister 702 and biases an opening edge 708 of the canister 702. In certain example embodiments, the second interference edges 408 of the friction clips 108 are lodged against an internal wall 710 of the canister 702, holding the lighting module 100 within the canister 702. In certain example embodiments, the second interference edges 408 are at an angle to the canister 702 such that twisting the light module 100 in a first direction would cause the light module 100 to be disposed further up within the canister 702, similar to a screw-like effect. Thus, the lighting module 100 can easily be tightened into the canister 702. In particular, the compound angle bend 114 allows the clip to use the edges 408 like a screw. When twisting clockwise, the entire module is "pulled" further into the canister. When twisting counterclockwise, the clips collapse, and the module can be easily removed from the canister.

Figure 15:
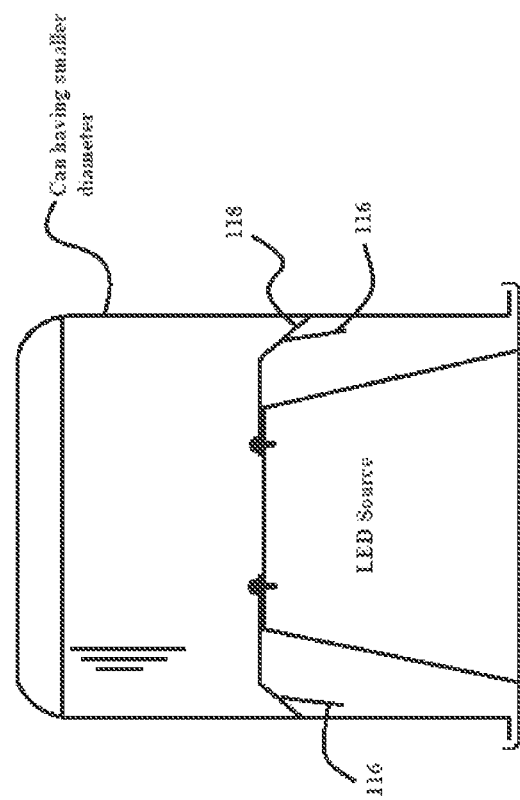
FIG. 15 illustrates a cross-sectional view of a recessed lighting fixture assembly disposed in a canister that is narrower than the canister illustrated in FIG. 7, in accordance with example embodiments of the present disclosure.

That is, to release the lighting module 100 from the canister 702, the lighting module 100 is rotated in a second direction in relation to the canister 702, the second direction being opposite the first direction. FIG. 7 shows use of the friction clips 108 with a canister 702 of the second size, utilizing the second interference edge 408. When the friction clips 108 are used with a smaller canister (the first size), the friction clips 108 are bent further down and inward such that the first interference edge 406 engages and lodges onto the internal wall of the canister as illustrated in FIG. 15. That is, when installed in a canister having smaller diameter (e.g., 5 inch), the first interference edge 406 of the clip engages an internal wall of the respective canister.

Light Module Embodiments with Torsion Spring

In some embodiments, the light module is provided with both friction clips and torsion springs to keep the light module retained within the canister 702. For example, the light module 800 illustrated in FIG. 8 includes both the torsion springs 818 coupled to their respective torsion brackets 814 and the friction clips 108. Even though the friction clips 108 and the torsion springs 818 are individually capable of retaining the light module within the canister 702, both the friction clips 108 and the torsion springs 818 are provided in the light module 800 to accommodate for the varying preferences of customers. For example, some customers prefer installing the light module within the canister 702 using the torsion spring 818 and torsion bracket 814, while other customers prefer using friction clip 108. Having two different light module models, one with friction clips and another with torsion springs may be less efficient and hence, one light module with both the friction clips and torsion springs is preferred. However, the presence of both the friction clips 108 and the torsion springs 818 in the light module 800 may create undesired installation complexities. For example, the torsion spring 818 and the friction clips 108 can in some instances interfere with each other during installation of the light module 800 within the canister 702. That is, a customer that desires to use the torsion spring 818 to mount and retain the light module 800 within the canister 702 may find that the friction clips 108 interfere with the torsion springs 818. Similarly, a customer that desires to use the friction clip 108 may find that the torsion springs 818 interfere with the friction clips 108.

Accordingly, there is a need for a mechanism that provides a customer with a flexible option for installation of the recessed lighting fixture using friction clips and torsion springs while avoiding interference between the friction clips and torsion springs.

Two-Part Friction Clip

One such mechanism that provides a customer with a flexible installation option is a two-part friction clip having a first member and a second member, where the first member has to be coupled to the second member to render the friction clip operational. In one example, the customer may receive the light module with the first member of the two-part friction clip and the torsion spring pre-installed at the factory (as shown in FIG. 9), while the second member of the two-part friction clip may be provided detached from the light module 800, such as in a separate container. Upon receiving the light module, if the customer desires to use friction clips for installing the light module in the canister 702, the customer can couple the second member to the first member of the two-part friction clip. Alternatively, if the customer desires to use the torsion spring for installing the light module in the canister 702, the customer may not couple the second member of the two-part friction clip to the first member. In particular, the first member of the two-part friction clip may be shorter in length than the second member and/or the single-piece friction clip 108 and is designed such that it does not interfere with the torsion springs. Accordingly, when the customer desires to use the torsion spring for installing the light module, the presence of the first member of the two-part friction clip does not create any interference with the torsion spring. In other words, the two-part friction clip of the present disclosure provides a customer with a flexible option for installation of the same recessed lighting fixture using either the friction clip or torsion spring while avoiding interference between the friction clip and torsion spring during installation.

Even though the above-mentioned example describes that the light module is fitted in a canister, one of ordinary skill in the art can understand and appreciate that any device can be used without departing from a broader scope of the present disclosure. For example, the light module can be retained in, inter alia, a canister, a junction box, or any other apparatus commonly used to hold lighting fixtures. Alternatively, in some embodiments, the light module can be fitted using an open frame fitting.

Further, even though the above-mentioned example describes the first member of a two-part friction clip as being pre-installed (at the factory) on the light module, one of ordinary skill in the art can understand and appreciate that in some embodiments, similar to the second member, the first member of the two-part friction clip may also be provided detached from the light module in a separate container. In said embodiment, the user may have to manually mount the first member of the two-part friction clip on the light module and then couple the second member of the two-part friction clip to the first member to make the friction clip operational. Further, even though the present disclosure describes a two-part friction clip, one of ordinary skill in the art can understand and appreciate that in some embodiments, the friction clip may have more than two parts without departing from a broader scope of the present disclosure.

Figure 11:
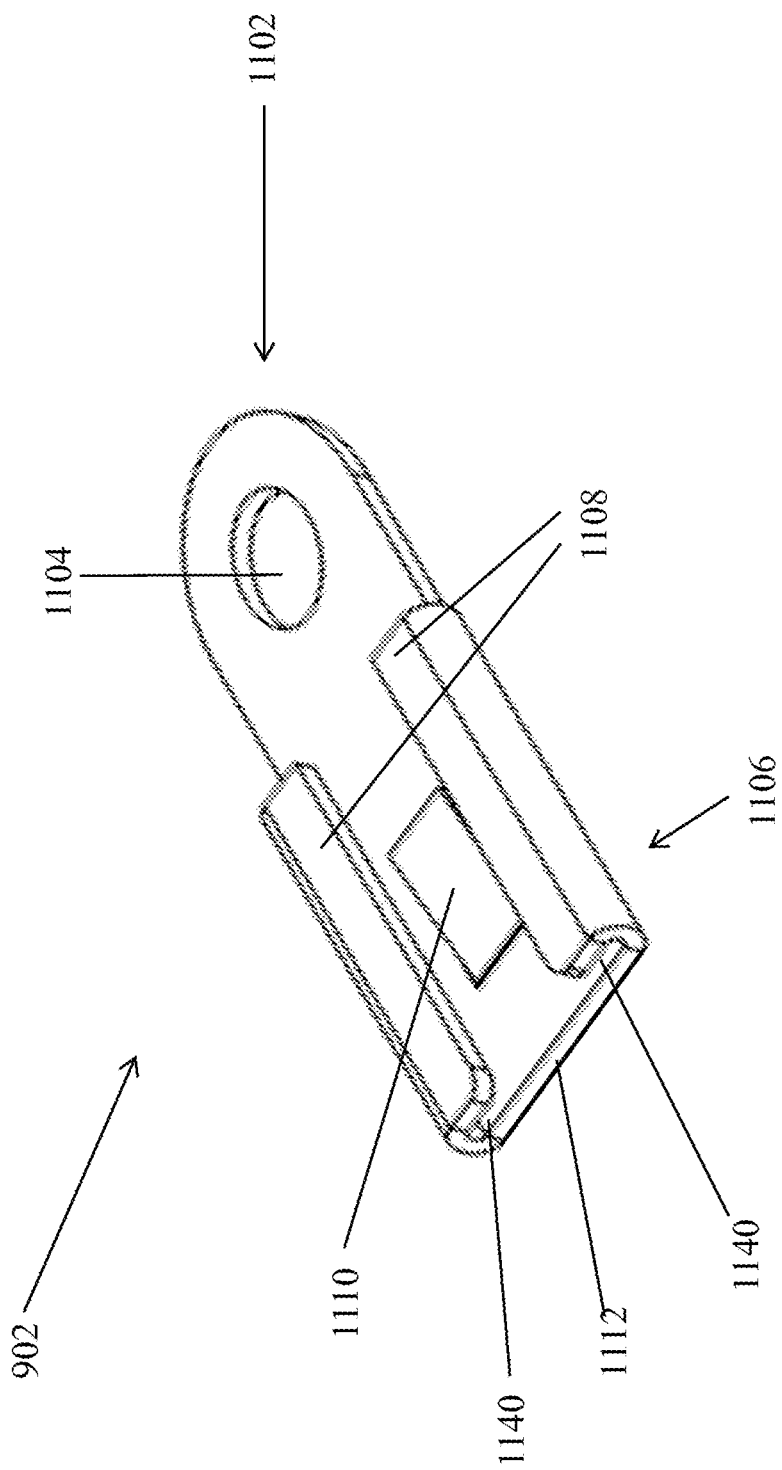
FIG. 11 illustrates a perspective view of the first member of the two-part friction clip, in accordance with example embodiments of the present disclosure.
Figure 12:
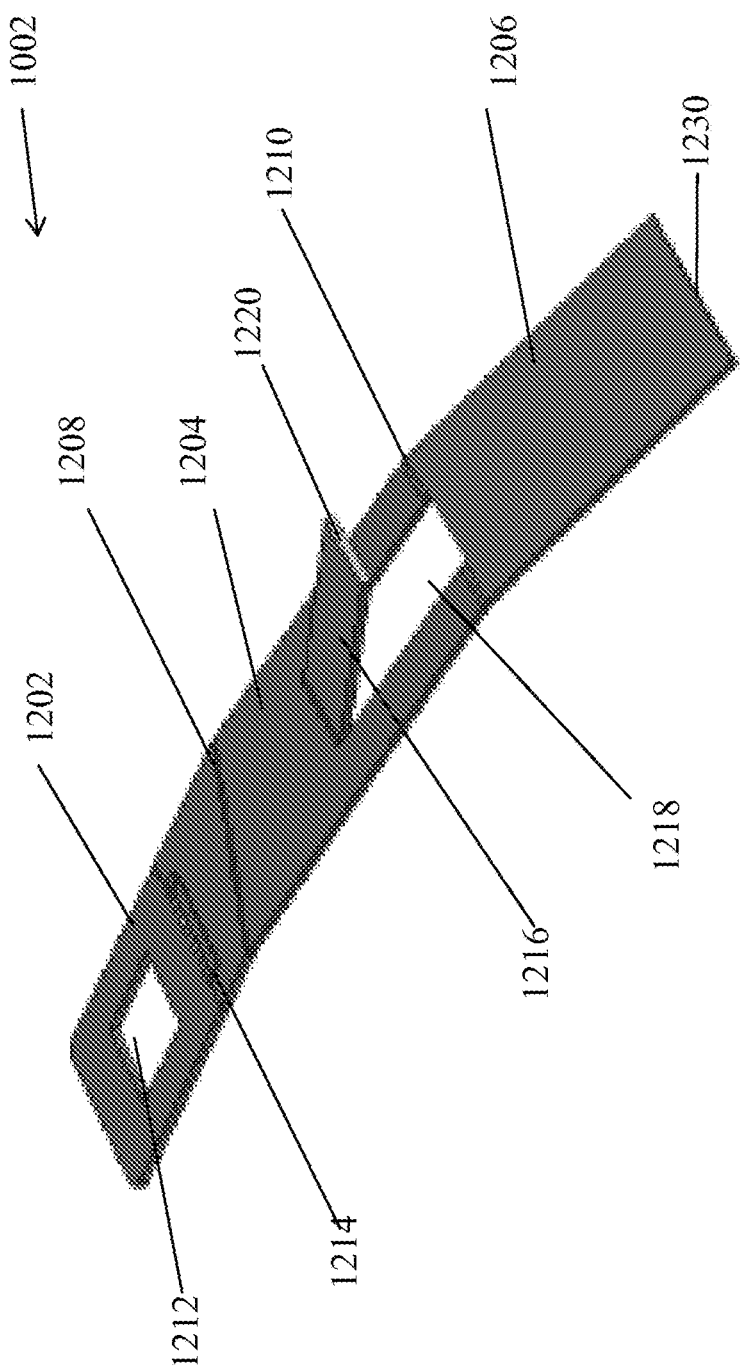
FIG. 12 illustrates one perspective view of the second member of the two-part friction clip, in accordance with example embodiments of the present disclosure.
Figure 13:
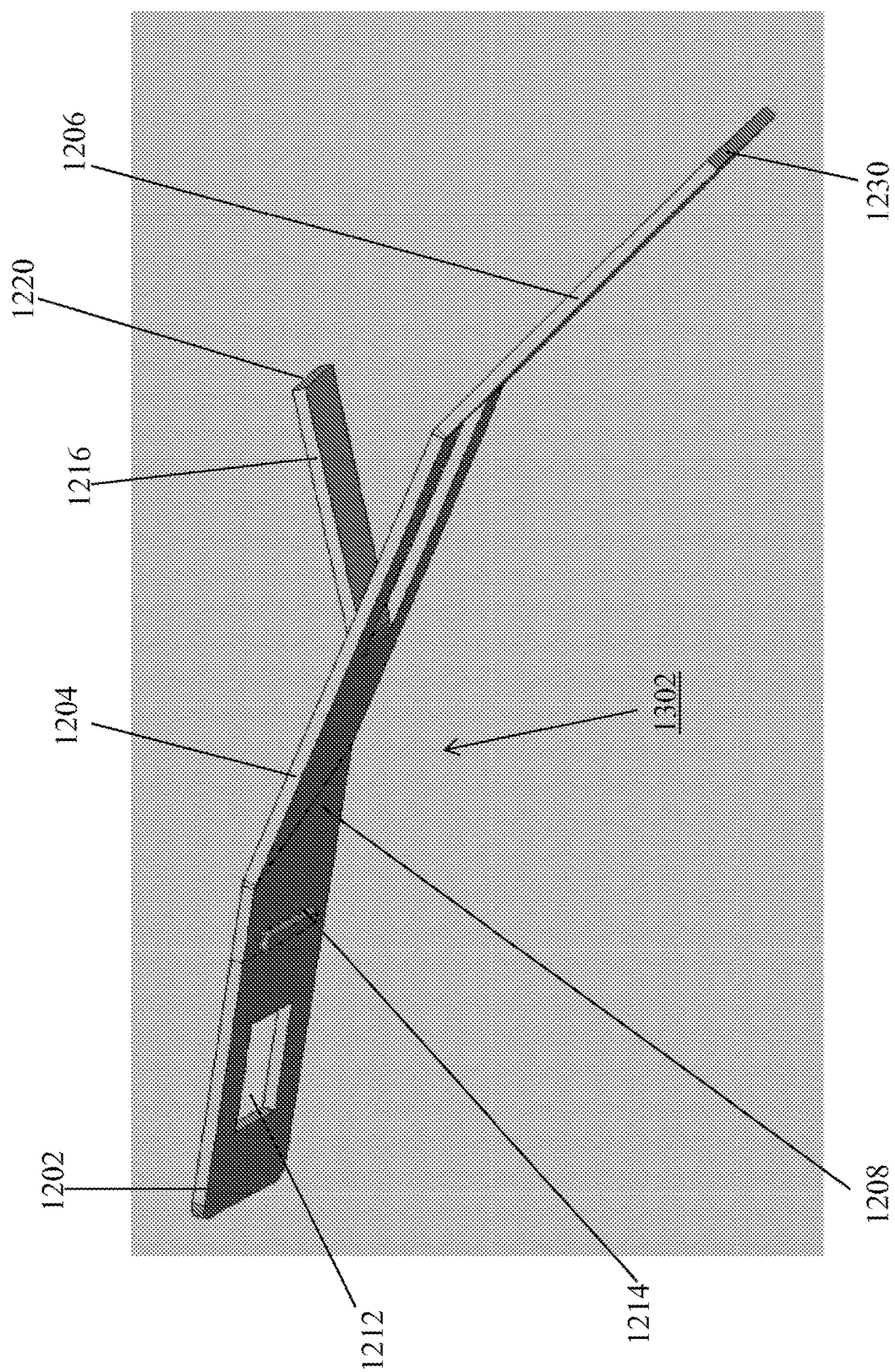
FIG. 13 illustrates another perspective view of the second member of the two-part friction clip, in accordance with example embodiments of the present disclosure.
Figure 14:
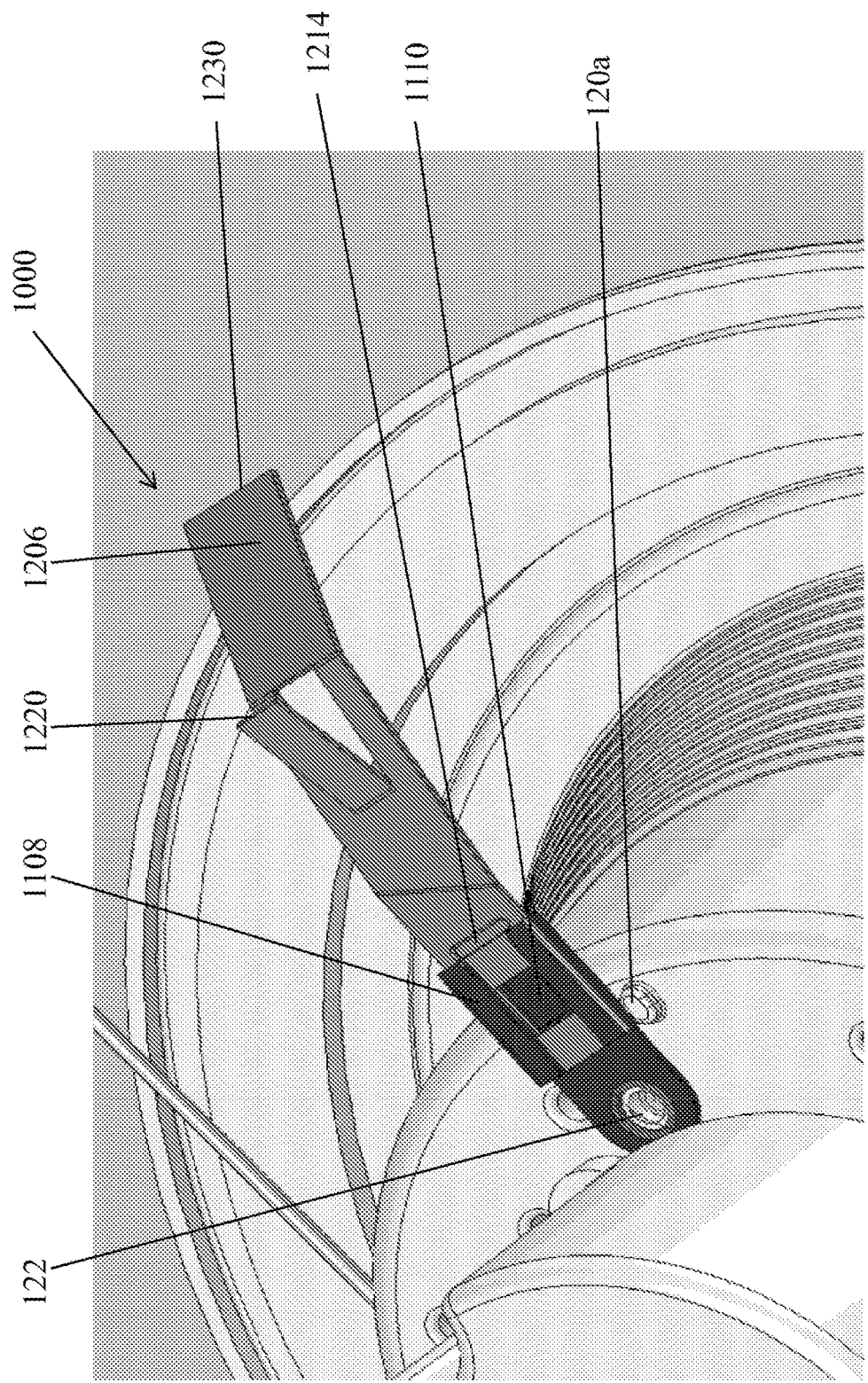
FIG. 14 illustrates a closer view of a coupling of the first member and the second member of the two-part friction clip, in accordance with example embodiments of the present disclosure.

FIG. 9 illustrates a perspective view of the lighting module having a first member of two-part friction clips mounted thereon, in accordance with example embodiments of the present disclosure. FIG. 10 illustrates a perspective view of the lighting module in which a second member of each two-part friction clip is coupled to the first member of the respective two-part friction clip which in turn is mounted on the lighting module, in accordance with example embodiments of the present disclosure. FIG. 11 illustrates a perspective view of the first member of the two-part friction clip, in accordance with example embodiments of the present disclosure. FIG. 12 illustrates one perspective view of the second member of the two-part friction clip, in accordance with example embodiments of the present disclosure. FIG. 13 illustrates another perspective view of the second member of the two-part friction clip, in accordance with example embodiments of the present disclosure. FIG. 14 illustrates a closer view of a coupling of the first member and the second member of the two-part friction clip, in accordance with example embodiments of the present disclosure.

Referring to FIGS. 9-14, the light module 800 includes a heat sink module 802. In particular, the heat sink module 802 includes a flange 804, a top surface 106, and a side wall portion 808 that extends from a perimeter of the top surface 106 to a portion of the flange 804. Further, the lighting module 800 includes a light emitting diode (LED) driver 812 that is disposed on the top surface 106 of the heat sink module 802 and is configured to drive one or more LEDs (not shown in Figures) coupled to heat sink module 802. Furthermore, the lighting module 800 includes one or more torsion spring brackets 814 to which a torsion spring 818 is coupled. The torsion spring bracket 814 may be coupled to the top surface 106 of the heat sink module 802 as illustrated in FIGS. 8-10. The one or more torsion springs 818 may be configured to bias the inside wall of a canister to securely retain the recessed lighting fixture 800 within the canister. In particular, the torsion bracket 814 to which the torsion spring 818 is coupled may be adjustable to fit the light module 800 in a canister of a first diameter (e.g., 5 inch) or a canister of a second diameter (e.g., 6 inch). Similarly, the light module 800 may include one or more two-part friction clips 1000 coupled to and arranged circumferentially on the top surface 106 of the heat sink module 802 as illustrated in FIGS. 8-10.

As described above, the two-part friction clip 1000 may include a first member 902, and a second member 1002 that is to be coupled to the first member 902 to render the friction clip 1000 operational. The first member 902 includes an upper portion 1102 and a lower portion 1106. The upper portion 1102 includes an aperture 1104 configured to rotatably couple the first member 902 to the top surface 106 of the heat sink module 802 via a fastener 122, such as a screw, rivet, etc. However, in some embodiments, the first member 902 may be immovably coupled to the top surface 106 of the heat sink module 802. In certain example embodiments, the fastener 122 functions as a pivot point for the first member 902 of the two-part fiction clip 1000, allowing the first member 902 of the two-part fiction clip 1000 to be movable from a first position to a second position between stop 120a and stop 120b, respectively. When the second member 1002 is coupled to the first member 902 and the friction clip 1000 is rendered operational, the fastener 122 functions as a pivot point for the two-part friction clip 1000, allowing the two-part friction clip 1000 (herein 'friction clip 1000') to be movable from a fully extended position to a retracted position. In certain example embodiments, the retracted position can be various degrees from the fully extended position as described above with respect to FIG. 3. In certain example embodiments, heat sink module 802 includes a plurality of stops 120a and 120b disposed on the top surface 106 of the heat sink module 802. The stops 120a and 120b are raised and disposed next to each friction clip 1000 on opposite sides of the respective friction clip 1000 such that the friction clip 1000 cannot rotate past the stops 120a and 120b. This keeps the friction clip 1000 in the fully extended position as the lighting module 800 is rotated during installation as described above with respect to FIGS. 1 and 7.

Further, the first member 902 of the two-part friction clip 1000 includes a pair of L shaped flanges 1108 at the lower portion 1106 of the first member 902 as illustrated in FIG. 11. The flanges 1108 extend in the same direction from opposite longitudinal ends of the first member 902. Further, each flange 1108 forms an elongated groove 1140 that is configured to engage and retain a respective longitudinal edge of a coupling portion 1202 of the second member 1002 of the two-part friction clip 1000 as illustrated in FIGS. 10 and 14. Further, the first member 902 includes locking tab 1110 disposed on the top surface of the first member 902 between the flanges 1108. In particular, the locking tab 1110 is partially cut out and raised from first member 902. Alternatively, the locking tab 1110 may not be formed as an addition to the first member 902 and not by partially cutting out and raising a portion of the first member. The locking tab 1110 forms an angle with the remainder of the first member 902 and is configured to engage with an aperture 1212 of the coupling portion 1202 of the second member 1002 as illustrated in FIGS. 10 and 14. The locking tab 1110 may be configured as a spring such that it compresses when force is applied and springs back to its original position when the force is absent. In particular, the locking tab 1110 of the first member 902 engages the aperture 1212 of the coupling portion 1202 of the second member 1002 to removably couple and lock the first member 902 to the second member. Even though the present disclosure describes the first and second members of the two-part friction clip as being removably coupled, the locking tab locks the members securely such that they are not detached by the movement of the light module or other light disturbances. In one example, to detach the second member 1002 from the first member 902, pressure may be applied to the locking tab 1110 to push it down within the aperture 1212 of the second member 1002, while pulling on the second member 1002 simultaneously.

Referring to FIGS. 12 and 13, the second member 1002 includes three main portions similar to the single-piece friction clip 108 as described above in association with FIGS. 4-6. In particular, the second member 1002 includes: a coupling portion 1202, a middle portion 1204, and an end portion 1206. In certain example embodiments, the coupling portion 1202 includes an aperture 1212 and/or a slide stopping tab 1214. The aperture 1212 allows the second member 1002 to engage the locking tab 1110 of the first member and be removably coupled to the first member 902 as illustrated in FIG. 14. Further, the slide stopping tab 1214 prevents the second member 1002 from sliding over the first member 902 beyond the slide stopping tab 1214. In particular, the slide stopping tab 1214 is a protrusion that extends from a bottom surface 1302 of the second member 1002. The slide stopping member 1214 is configured to engage with an edge 1112 on the lower portion 1106 of the first member 902 forming an obstruction and thereby restricting a free slide of the second member 1002 over the first member 902.

In certain example embodiments, the middle portion 1204 is adjacent the coupling portion 1202 at a compound angle 1208. That is, the middle portion 1204 is at an angle from the coupling portion 1202 horizontally as well as vertically. In certain example embodiments, the middle portion 1204 is only at a horizontal angle or only at a vertical angle to the coupling portion 1202. In certain example embodiments, the middle portion 1204 includes a bent out tab 1216 that is partially cut out and raised from a middle portion 1204. The tab 1216 includes a first interference edge 1220. The first interference edge 1220 is configured to bias the inside wall of a canister of a first size. In such example embodiments, the spring force of the friction clip against the wall of the canister 702 and the friction between the first interference edge 1220 and the wall retains the recessed lighting fixture 800 within the canister 702. In certain example embodiments, the end portion 1206 is adjacent to the middle portion 1204 and at the opposite end from the coupling portion 1202.

In certain example embodiments, end portion 1206 is bent at a horizontal angle 1210 from the plane of the middle portion 1204. In certain example embodiments, the end portion 1206 is bent at a compound angle in which the end portion 1206 is at a horizontal angle as well as a vertical angle to the middle portion 1204. In certain example embodiments, the end portion 1206 includes a second interference edge 1230. The second interference edge 1230 is configured to bias the inside wall of a canister of a second size. In such example embodiments, the spring force of the second member 1002 against the wall of the canister 702 and the friction between the second interference edge 1230 and the wall retains the recessed lighting fixture 800 within the canister 702. In certain example embodiments, the canister of a second size has a larger internal diameter than the canister of a first size. For example, the first size can be five inches and the second size can be six inches. In particular, the second member 1002 of the friction clip 1000 can be bent at the portions 1208 and 1210 where the coupling portion 1202 forms a compound angle with the middle portion 1204 and the middle portion 1204 forms a horizontal angle with the end portion 1206, respectively. In a six inch canister housing the interference edges 1230 of the end portion engages the interior portion of the canister housing. However, when the light module 800 is fitted within a canister housing of a smaller diameter, e.g., 5 inch, the friction clip 1000 will be bent downwards at portions 1208 and/or 1210 such that the interference edge 1220 of the bent out tab 1216 and/or the interference edge 1230 engages the interior portion of the canister housing rather than only the interference edges 1230. In particular, to install the fixture within the canister, the fixture may be adjusted such that the springs/friction clips that are flexible move deeper within the canister causing the springs/friction clips to have more deflection and retention force. This eliminates or reduces "sag" of the light fixture when installed in the canister.

The presence of multiple interference edges 1220, 1230 allow the same friction clip 1000 to fit and provide retention within canisters of multiple sizes.

In certain other example embodiments, the second member 1002 includes only two portions, wherein a coupling portion is directly adjacent an end portion. In such example embodiments, the tab 1216 is in the end portion. In such example embodiments, the end portion is formed at a compound angle from the coupling portion. In certain other example embodiments, the second member 1002 includes more than three portions. In such example embodiments, the second member 1002 includes a coupling portion and an end portion, and a plurality of segments in between the coupling portion and the end portion, in which the tab 1216 can be formed in any of the plurality of segments. In certain such example embodiments, a tab 1216 can be formed in multiple segments, generating multiple interference edges. In certain example embodiments, the compound angle 1208 can be formed between any one or more segments. In certain example embodiments, a horizontal angle is formed between a first set of two segments and a vertical angle is formed between a second set of two segments.

In certain example embodiments, the second member 1002 is continuous and has twists or curved compound bends rather than sharp angular bends as shown in the figures. In such example embodiments, the first and second interference edges 1220, 1230 are still at an angle to the top surface 106 of the heat sink module 802. In certain example embodiments, the first member 902 and the second member 1002 of the friction clip 1000 are fabricated from a metallic material. In certain example embodiments, each of the first member 902 and the second member 1002 of the friction clip 1000 are fabricated integrally from one continuous piece of material.

In order to couple the second member 1002 to the first member 902, a user may slide the coupling portion 1202 of the second member 902 over the first member 902 such that (i) a bottom surface 1302 of the coupling member 1202 is in contact with a top surface of the first member 902, (ii) and the longitudinal edges of the coupling portion 1202 are retained within the grooves 1140 formed by the flanges 1108 in the first member 902. As the coupling portion 1202 of the second member 1002 slides over the first portion 1002, the coupling portion 1202 engages the lock tab 1110 and the locking tab 1110 is pushed down by a force exerted by sliding the coupling portion 1202 of the second member 1002 over the first portion 1002. Later, when the lock tab 1110 engages the aperture 1212 of the coupling portion, the lock tab 1110 of the first member 902 springs back and extends through the aperture 1212 of the second member 1002 to lock the first and second members of the friction clip 1000 as illustrated in FIG. 14. Additionally, any further sliding may be prevented by the slide stopping tab 1214 of the second member 1002.

Even though the present disclosure describes a slide and lock method of removably coupling the first member 902 to the second member 1002 of the friction clip 1000, one of ordinary skill in the art can understand and appreciate that any other appropriate coupling mechanism may be used to couple the first member 902 to the second member 1002 without departing from a broader scope of the present disclosure. For example, the first member 902 and the second member 1002 may be coupled using a screw (or any other suitable fastener) provided the first member 902 is modified to include an aperture to receive and retain the screw through the aperture. Further, one of ordinary skill in the art can understand and appreciate that the slide stopping mechanism described in the present disclosure is not limiting. That is, any other mechanism to stop the sliding of the two members can be used without departing from a broader scope of the present disclosure. For example, the slide stopping tab may be present on the first member 902 above the locking tab 1110 instead of the second member 1002.

Although the inventions are described with reference to example embodiments, it should be appreciated by those skilled in the art that various modifications are well within the scope of the invention. From the foregoing, it will be appreciated that an embodiment of the present invention overcomes the limitations of the prior art. Those skilled in the art will appreciate that the present invention is not limited to any specifically discussed application and that the embodiments described herein are illustrative and not restrictive. From the description of the example embodiments, equivalents of the elements shown therein will suggest themselves to those skilled in the art, and ways of constructing other embodiments of the present invention will suggest themselves to practitioners of the art. Therefore, the scope of the present invention is not limited herein.

What is claimed is:

1. A lighting module, comprising:
a module housing comprising a top; and
a friction clip comprising a top surface, a bottom surface opposite to the top surface, a top edge, a bottom edge, and two side edges that are disposed opposite to each other and extending between the top edge and the bottom edge, the friction clip further comprising:
a coupling portion extending from the top edge to an intermediate bend, the coupling portion being rotatably coupled to the top of the module housing; and
an end portion extending from the intermediate bend to the bottom edge, the end portion comprising:
a first interference edge defined by the bottom edge of the friction clip, and
a bent out tab disposed between the two side edges, the bent out tab projecting upward and defining a second interference edge;
wherein the first interference edge is configured to lodge against an internal wall of a first canister, and the second interference edge is configured to lodge against an internal wall of a second canister, the second canister being smaller than the first canister.

2. The lighting module of claim 1, wherein the end portion is coupled to the coupling portion at a compound angle such that the intermediate bend of the friction clip forms an obtuse angle with a first side edge of the two side edges of the friction clip and an acute inner angle with a second side edge of the two side edges of the friction clip.

3. The lighting module of claim 1, wherein the intermediate bend is disposed between the top edge and the bottom edge.

4. The lighting module of claim 1,
wherein one edge of the bent out tab is coupled to the end portion of the friction clip while remaining edges of the bent out tab are detached from the end portion.

5. The lighting module of claim 1, further comprising a raised stop disposed on the top of the module housing, wherein the raised stop prevents rotation of the friction clip beyond the raised stop.

6. The lighting module of claim 1, wherein the friction clip is adjustable between an extended position and a collapsed position.

7. A friction clip comprising:
a top edge;
a bottom edge;
a pair of side edges that are disposed opposite to each other and that extend between the top edge and the bottom edge;
a top surface;
a bottom surface;
a coupling portion extending from the top edge to a first intermediate bend and comprising a coupling element;
a middle portion adjacent the coupling portion and extending from the first intermediate bend to a second intermediate bend, the middle portion comprising a bent out tab that is disposed between the pair of side edges and that projects upward from a remainder of the middle portion in a direction opposite to the bottom surface, the bent out tab comprising a first interference edge, wherein the first interference edge is configured to lodge into an internal wall of a first canister; and
an end portion adjacent the middle portion opposite the coupling portion and extending from the second intermediate bend to the bottom edge, the end portion comprising a second interference edge defined by the bottom edge and configured to lodge into an internal wall of a second canister, wherein the second canister has an internal diameter larger than that of the first canister.

8. The friction clip of claim 7, wherein the middle portion is at a compound angle to the coupling portion such that the first intermediate bend of the friction clip forms an obtuse inner angle with a first side edge of the pair of side edges of the friction clip and an acute inner angle with a second side edge of the pair of side edges of the friction clip.

9. The friction clip of claim 7, wherein the first interference edge is at an angle to the coupling portion.

10. The friction clip of claim 7, wherein the second interference bend is at an angle to at least one of the coupling portion and the middle portion.

11. The friction clip of claim 7, wherein the coupling element of the coupling portion is an aperture that is configured to receive a coupling device to rotatably couple the friction clip to a lighting module.

12. The friction clip of claim 7, wherein the friction clip is bendable to fit a lighting module within the first and second canisters of different internal diameter.

13. A friction clip comprising:
a first member adapted to be coupled to a light module; and
a second member adapted to removably couple to the first member and comprising:
a top surface;
a bottom surface opposite to the top surface;
a top edge;
a bottom edge;
two side edges that are disposed opposite to each other and extending between the top edge and the bottom edge;
a coupling portion configured to removably engage with the first member and extending from the top edge to an intermediate bend; and
an end portion extending from the intermediate bend to the bottom edge, the end portion comprising:
an end portion interference edge defined by the bottom edge of the second member and configured to lodge into an internal wall of a first canister, and
a bent out tab that is disposed between the two side edges and that projects upward from a remainder of the end portion in a direction opposite to the bottom surface, the bent out tab comprising a tab interference edge that is configured to lodge into an internal wall a second canister, wherein the second canister is smaller than the first canister.

14. The friction clip of claim 13, wherein the first member comprises:
an aperture adapted to receive a coupling member that couples the first member to the light module;
a first flange extending from a first side of the first member and a second flange extending from a second side of the first member; and
a locking tab disposed between the first and second flanges.

15. The friction clip of claim 14, wherein each of the first flange and the second flange are L-shaped and form a groove adapted to receive a side edge of the two side edges of the second member.

16. The friction clip of claim 14, where the coupling portion of the second member comprises an aperture adapted to engage the locking tab.

17. The friction clip of claim 13, wherein the second member is flexible.

18. The friction clip of claim 13, wherein the second member further comprises a middle portion disposed between the coupling portion and the end portion, wherein the middle portion is at a compound angle to the coupling portion, and wherein the middle portion is at an angle to the end portion.

19. The friction clip of claim 13, the end portion is at a compound angle to the coupling portion such that the intermediate bend of the friction clip forms an obtuse inner angle with a first side edge of the two side edges of the friction clip and an acute inner angle with a second side edge of the two side edges of the friction clip.

20. The friction clip of claim 13, wherein the coupling portion of the second member comprises a slide stopping tab extending from the bottom surface of the second member.

* * * * *